United States Patent
Wang et al.

(10) Patent No.: US 10,016,929 B2
(45) Date of Patent: Jul. 10, 2018

(54) 3D PRINTER SPRAY NOZZLE CAPABLE OF ADJUSTING CROSS SECTION AREAS OF EXTRUDED MATERIALS AND METHOD FOR CONTROLLING PRINTING SPEED AND PRECISION OF THE 3D PRINTER SPRAY NOZZLE

(71) Applicant: CLOUD COMPUTING CENTER CHINESE ACADEMY OF SCIENCES, DongGuan, Guangdong (CN)

(72) Inventors: Feiyue Wang, Guangdong (CN); Gang Xiong, Guangdong (CN); Zhen Shen, Guangdong (CN); Xue Liu, Guangdong (CN)

(73) Assignee: CLOUD COMPUTING CENTER CHINESE ACADEMY OF SCIENCES, DongGuan, Guangdong (CN)

( * ) Notice: Subject to any disclaimer, the term of this patent is extended or adjusted under 35 U.S.C. 154(b) by 350 days.

(21) Appl. No.: 14/778,108

(22) PCT Filed: Jul. 18, 2014

(86) PCT No.: PCT/CN2014/082514
§ 371 (c)(1),
(2) Date: Jan. 14, 2016

(87) PCT Pub. No.: WO2016/004642
PCT Pub. Date: Jan. 14, 2016

(65) Prior Publication Data
US 2018/0079139 A1    Mar. 22, 2018

(30) Foreign Application Priority Data

Jul. 11, 2014 (CN) .......................... 2014 1 0331972

(51) Int. Cl.
*B33Y 30/00* (2015.01)
*B29C 64/393* (2017.01)
(Continued)

(52) U.S. Cl.
CPC .......... *B29C 64/393* (2017.08); *B29C 64/209* (2017.08); *B29C 64/241* (2017.08);
(Continued)

(58) Field of Classification Search
None
See application file for complete search history.

(56) References Cited

U.S. PATENT DOCUMENTS

| 2014/0061974 A1* | 3/2014 | Tyler .................. B29C 67/0055 264/401 |
| 2015/0352797 A1* | 12/2015 | Kanada .................. D01F 6/625 428/212 |
| 2017/0217100 A1* | 8/2017 | Gardiner ............. B29C 67/0088 |

* cited by examiner

*Primary Examiner* — Paul Yanchus, III

(57) ABSTRACT

A 3D printer spray nozzle includes a feeding pipeline, an extruder located under the feeding pipeline, an external housing and a driving device; wherein the feeding pipeline is embedded in the external housing, the extruder is coaxially fixed under the feeding pipeline, a center of gravity of a cross section area of an inner channel of the feeding pipeline and that of the extruder are located on a same axis which is perpendicular to the cross section area of the inner channel of the feeding pipeline and that of the extruder, the feeding pipeline is driven by the driving device to rotate around the axis relative to the extruder, thereby aiming at different rotation angles, widths of extruding forming areas of the extruder at a same direction are different so as to adjust a cross section area of a sprayed filament.

16 Claims, 3 Drawing Sheets

(51) Int. Cl.
  *B33Y 50/02*    (2015.01)
  *B29C 64/209*   (2017.01)
  *G05B 19/4099*  (2006.01)
  *B29C 64/241*   (2017.01)
  *B29K 55/02*        (2006.01)
  *B29K 67/00*        (2006.01)

(52) U.S. Cl.
  CPC ............... *B33Y 30/00* (2014.12); *B33Y 50/02* (2014.12); *G05B 19/4099* (2013.01); *B29K 2055/02* (2013.01); *B29K 2067/046* (2013.01); *G05B 2219/49023* (2013.01)

3D PRINTER SPRAY NOZZLE CAPABLE OF ADJUSTING CROSS SECTION AREAS OF EXTRUDED MATERIALS AND METHOD FOR CONTROLLING PRINTING SPEED AND PRECISION OF THE 3D PRINTER SPRAY NOZZLE

CROSS REFERENCE OF RELATED APPLICATION

This is a U.S. National Stage under 35 U.S.C 371 of the International Application PCT/CN2014/082514, filed Jul. 18, 2014, which claims priority under 35 U.S.C. 119(a-d) to CN 201410331972.9, filed Jul. 11, 2014.

BACKGROUND OF THE PRESENT INVENTION

Field of Invention

The present invention relates to a technical field of 3D printing, and more particularly to a 3D printer with sprayed filaments whose cross section areas are adjustable and a method for controlling printing speed and precision of the 3D printer.

Description of Related Arts 3D printing, as a rapid prototyping technology, uses software for hierarchical discretization of 3D digital models, then uses adhesive materials such as powdered metal or plastic materials, for constructing an object through stacking layer by layer. 3D printing technology belongs to plus manufacturing, which is different from the traditional minus manufacturing, and is better in saving raw materials.

Currently, the commonly seen 3D printing technology is fuse deposition technology, which melts filamentous hot-melt materials, and extrudes through a spray nozzle with a micro channel. After being sprayed by the spray nozzle, the filamentous hot-melt materials are deposited on a workbench, and are solidified when a temperature is lower than a solidifying temperature. Finally a product is formed by stacking the materials. For 3D printing, the spray nozzle is a core part, but an inner cross section of an extruder of the spray nozzle of a conventional 3D printer is only circular. In a unit time, an effective forming width of the spray nozzle is certain. Due to the inner cross section of the spray nozzle is not adjustable, printing precision and speed and the 3D printer are not able to be controlled. Therefore, for different printing purposes and different print areas (different models or the same model), different printing precision and speed are not able to be achieved.

SUMMARY OF THE PRESENT INVENTION

A first object of the present invention is to provide a 3D printer spray nozzle, which is capable of adjusting cross section areas of extruded materials to adjust printing speed and precision, aiming at a problem that internal cross section shapes of conventional 3D printer spray nozzles are all circular, so printing speed and precision of different models or different parts of a same model are not controllable.

A second object of the present invention is to provide a method for controlling printing speed and precision according to printing requirements, aiming at a problem that internal cross section shapes of conventional 3D printer spray nozzles are all circular, so printing speed and precision of different models or different parts of a same model are not controllable.

Accordingly, in order to accomplish the first object, the present invention provides a 3D printer spray nozzle, comprising:

a feeding pipeline, an extruder located under the feeding pipeline, an external housing and a driving device; wherein the feeding pipeline is embedded in the external housing, the extruder is coaxially fixed under the feeding pipeline, a center of gravity of a cross section area of an inner channel of the feeding pipeline and a center of gravity of a cross section area of an inner channel of the extruder are located on a same axis which is perpendicular to the cross section area of the inner channel of the feeding pipeline and the cross section area of the inner channel of the extruder, the feeding pipeline is driven by the driving device to rotate around the axis relative to the extruder, thereby aiming at different rotation angles, widths of extruding forming areas of the extruder at a same direction are different so as to adjust a cross section area of a sprayed filament.

The driving device comprises a rotary table and a motor, wherein the rotary table is connected with a body of the printer, the motor is located within the external housing and is capable of driving the rotary table to rotate, and the feeding pipeline is fixed at a lower end of the rotary table.

Both the cross section area of the inner channel of the feeding pipeline and that of the extruder are regular polygons.

The regular polygons comprise triangles and rectangles.

Both the cross section area of the inner channel of the feeding pipeline and that of the extruder are a same rectangle, wherein a length of a long side of the rectangle is Lmax, a length of a short side thereof is Lmin; a rotation angle of the feeding pipeline around the axis perpendicular to both the cross section area of the inner channel of the feeding pipeline and that of the extruder is $\theta$; when the spray nozzle with the rotation angle of $\theta$ works along one direction, a width of an effective printing region is Lmax×sin $\theta$+Lmin×cos $\theta$; when the spray nozzle has a constant moving speed, a forming height of Z axis at every layer is a certain value, an area of the effective printing region of the spray nozzle at different rotation angles is in direct proportion to the width thereof in a unit time.

The external housing comprises a heater for heating ABS or PLA fusible transferring material in the feeding pipeline, such that the material is in a melted state.

Accordingly, in order to accomplish the second object, the present invention provides a method for controlling printing speed and precision, wherein:

a method for controlling the printing speed comprises steps of:

defining a printing speed V=K*S*L; wherein S is a cross section area of a filament actually sprayed by an extruder, L is a unit printing forming area, and K is a printing related constant;

determining a feeding speed by the cross section area S of the filament actually sprayed by the extruder and the unit printing forming area L, wherein a melting speed is also affected; the feeding speed and the melting speed together determine the printing speed; and forming a signal referring to changes of S and L for controlling the printing speed and adjusting the feeding speed of a feeding pipeline of a spray nozzle;

wherein a method for controlling the printing precision comprises steps of: according to different precision requirements, adjusting the printing speed for controlling the printing precision; wherein, when high printing precision is required, the printing speed is slow; when low printing precision is required, the printing speed is fast.

A rotation angle of the extruder is adjusted by a motor for changing the cross section area S of the filament actually sprayed by the extruder in a unit time; because a working moving speed of the spray nozzle is constant, for ensuring Z-axis forming heights of all layers are identical, the feeding speed of the feeding pipeline is real-time controlled according to the cross section area S of the filament actually sprayed by the extruder; the feeding speed equals in value to the melting speed of the transferred materials, and also equals to the printing speed V during printer working.

Both the cross section area of the inner channel of the feeding pipeline and that of the extruder are a same rectangle, wherein a length of a long side of the rectangle is Lmax, a length of a short side thereof is Lmin; when the spray nozzle has a constant moving speed, a forming height of Z-axis at every layer is a certain value, an area of the effective printing region of the spray nozzle at different rotation angles is in direct proportion to the width thereof in a unit time; a width of an effective printing region is Lmax×sin θ+Lmin×cos θ; wherein a rotation angle of the feeding pipeline around the axis perpendicular to both the cross section area of the inner channel of the feeding pipeline and that of the extruder is θ.

Beneficial Effects

The present invention controls rotation of the motor for controlling the rotation angle of the extruder relative to the feeding pipeline, in such a manner that different printing forming widths are selected for controlling the printing forming areas to control the printing precision and speed of a printer. The present invention is able to adjust different printing precision and speed according to different printing purposes and different printing areas.

BRIEF DESCRIPTION OF THE DRAWINGS

Referring to drawings, the present invention is further illustrated.

DETAILED DESCRIPTION OF THE PREFERRED EMBODIMENT

Figure 1:
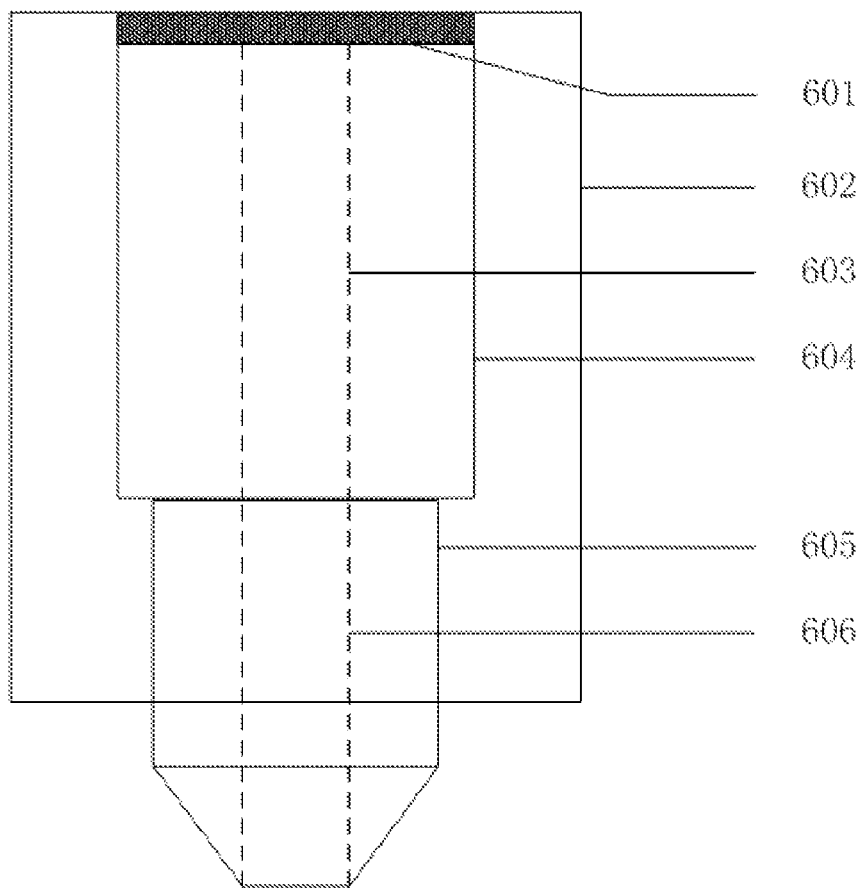
FIG. 1 is a front view of a printer spray nozzle according to the present invention.

FIG. 1 is a front view of a printer spray nozzle according to the present invention. The printer spray nozzle comprises an external housing 602, a feeding pipeline 604 and an extruder 605. The external housing 602 comprises a heater for heating transferring materials in the feeding pipeline, such that the materials are in a melted state. The extruder 605 is fixed under the feeding pipeline 604. Both a cross section area of an inner channel 603 of the feeding pipeline and a cross section area of an inner channel 606 of the extruder are regular polygons such as triangles and rectangles. A center of gravity of the cross section area of the inner channel 603 of the feeding pipeline and a center of gravity of the cross section area of an inner channel 606 of the extruder are located on a axis which is perpendicular to both the cross section area of the inner channel 603 of the feeding pipeline and the cross section area of the inner channel 606 of the extruder.

The feeding pipeline 604 is fixed at a lower end of a rotary table 601, the rotary table 601 is connected with a body of a printer, and is capable of rotating around the axis which is perpendicular to both the cross section area of the inner channel 603 of the feeding pipeline and the cross section area of the inner channel 606 of the extruder. The external housing 602 comprises a motor for controlling a rotation of the rotary table 601. A rotation angle of the rotary table is adjusted by a cycle number of the motor.

In this technical solution, the inventive conception is briefly described. Both the cross section area of the inner channel 603 of the feeding pipeline and the cross section area of the inner channel 606 of the extruder are a same rectangle, wherein a length of a long side of the rectangle is Lmax, a length of a short side thereof is Lmin.

Figure 2:
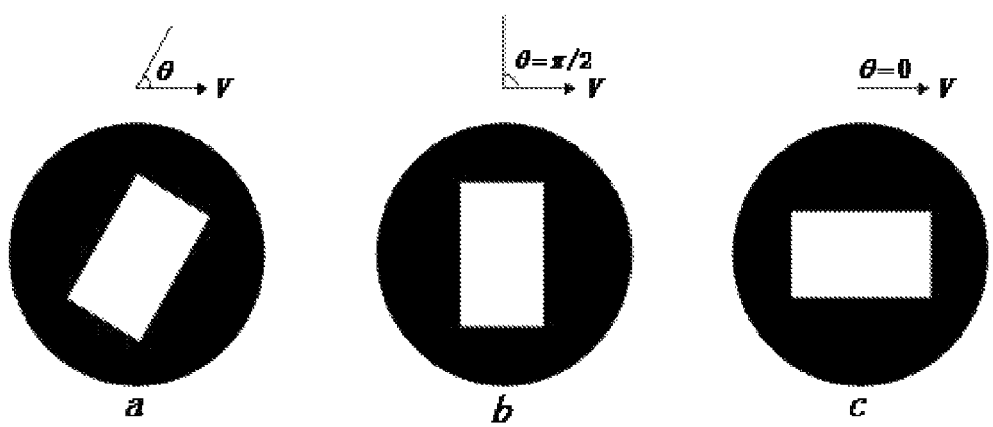
FIG. 2 is a top view of the printer spray nozzle at different rotation angles according to the present invention.

The rotation of the spray nozzle is adjustable by a rotation of the rotary table 601. As shown in FIG. 2, FIGS. 2a, 2b and 2c are top views of the inner channels of the spray nozzles at different rotation angles, respectively. When the spray nozzle at a rotation angle of θ works along one direction, a width of an effective printing region is Lmax×sin θ+Lmin× cos θ. While working, the spray nozzle has a constant moving speed, a forming height of Z-axis at every layer is a certain value, so an area of the effective printing region of the spray nozzle at different rotation angles is in direct proportion to the width thereof in a unit time. When the spray nozzle with different rotation angles works, the feeding speed of the feeding pipeline is needed to be controlled real-time. As shown in FIG. 2, the rotation angle of the spray nozzle in FIG. 2c is θ, the width of the effective printing region is Lmin at this moment, the printing precision is highest, and the printing speed is slowest, which is suitable for conditions with higher printing precision requirements.

Figure 3:
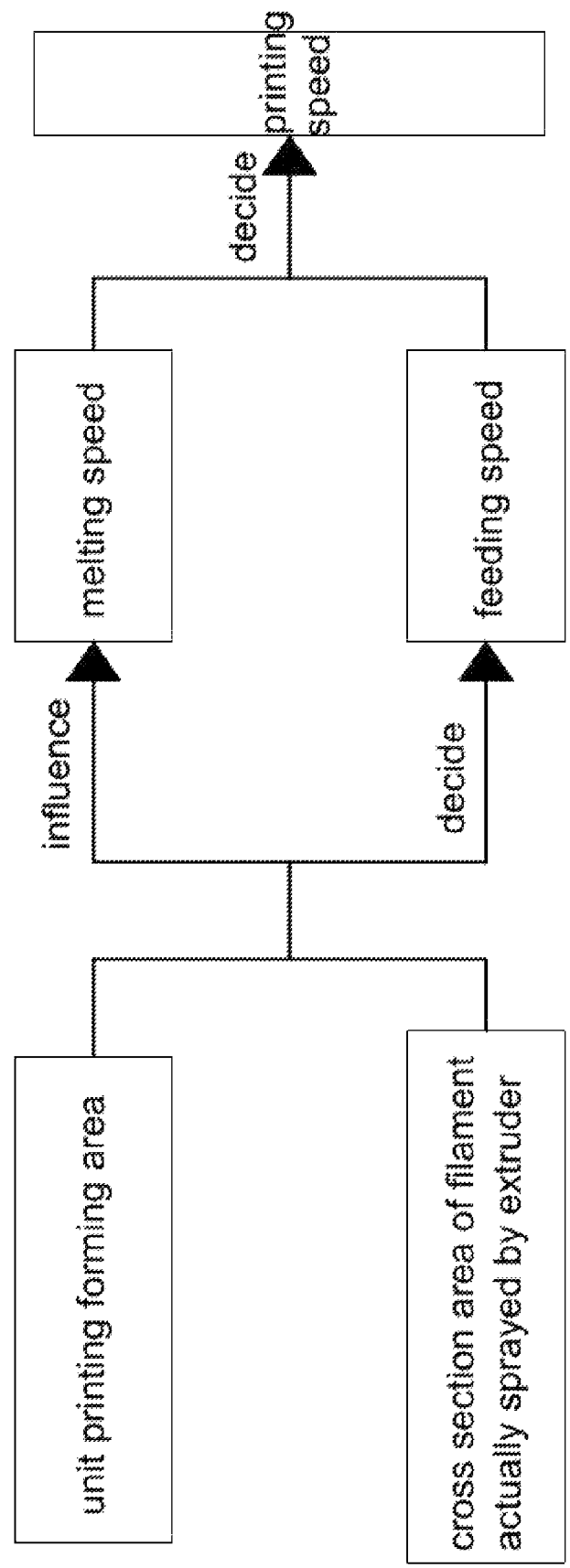
FIG. 3 is a logic diagram of factors influencing a printing speed according to the present invention.
Figure 4:
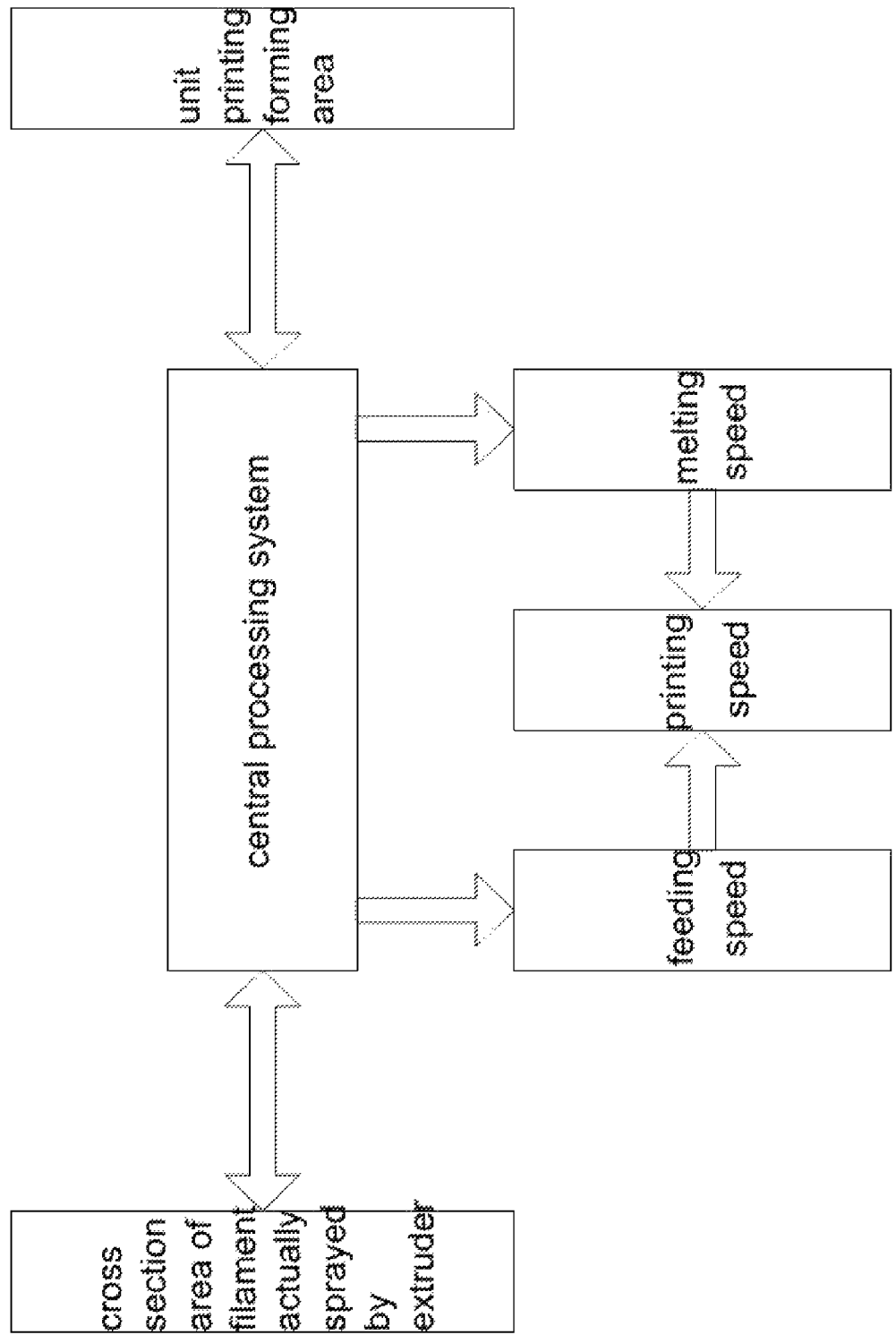
FIG. 4 is a schematic view of a printing speed adjusting system according to the present invention.

Referring to FIGS. 3 and 4, according to the present invention, a method for controlling the printing speed comprises steps of:

defining a printing speed V=K*S*L; wherein S is a cross section area of a filament actually sprayed by an extruder, L is a unit printing forming area, and K is a printing related constant;

determining a feeding speed by the cross section area S of the filament actually sprayed by the extruder and the unit printing forming area L, wherein a melting speed is also affected; the feeding speed and the melting speed together determine the printing speed; and forming a signal referring to changes of S and L for controlling the printing speed and adjusting the feeding speed of a feeding pipeline of a spray nozzle.

What is claimed is:

1. A 3-dimensional printer spray nozzle capable of adjusting cross section areas of extruded materials, comprising: a feeding pipeline, an extruder located under the feeding pipeline, an external housing and a driving device; wherein the feeding pipeline is embedded in the external housing, the extruder is coaxially fixed under the feeding pipeline, a center of gravity of a cross section area of an inner channel of the feeding pipeline and a center of gravity of a cross section area of an inner channel of the extruder are located on a same axis which is perpendicular to the cross section area of the inner channel of the feeding pipeline and the cross section area of the inner channel of the extruder, the feeding pipeline is driven by the driving device to rotate around the axis relative to the extruder, thereby aiming at different rotation angles, widths of extruding forming areas of the extruder at a same direction are different so as to adjust a cross section area of a sprayed filament.

2. The 3-dimensional printer spray nozzle capable of adjusting cross section areas of extruded materials, as recited in claim 1, wherein the driving device comprises a rotary table and a motor, wherein the rotary table is connected with a body of the printer, the motor is located within the external housing and is capable of driving the rotary table to rotate, and the feeding pipeline is fixed at a lower end of the rotary table.

3. The 3-dimensional printer spray nozzle capable of adjusting cross section areas of extruded materials, as recited in claim 1, wherein both the cross section area of the inner channel of the feeding pipeline and that of the extruder are regular polygons.

4. The 3-dimensional printer spray nozzle capable of adjusting cross section areas of extruded materials, as recited in claim 2, wherein both the cross section area of the inner channel of the feeding pipeline and that of the extruder are regular polygons.

5. The 3-dimensional printer spray nozzle capable of adjusting cross section areas of extruded materials, as recited in claim 3, wherein the regular polygons comprise triangles and rectangles.

6. The 3-dimensional printer spray nozzle capable of adjusting cross section areas of extruded materials, as recited in claim 4, wherein the regular polygons comprise triangles and rectangles.

7. The 3-dimensional printer spray nozzle capable of adjusting cross section areas of extruded materials, as recited in claim 5, wherein both the cross section area of the inner channel of the feeding pipeline and that of the extruder are a same rectangle, wherein a length of a long side of the rectangle is Lmax, a length of a short side thereof is Lmin; a rotation angle of the feeding pipeline around the axis perpendicular to both the cross section area of the inner channel of the feeding pipeline and that of the extruder is $\theta$; when the spray nozzle with the rotation angle of $\theta$ works along one direction, a width of an effective printing region is Lmax×sin $\theta$+Lmin×cos $\theta$; when the spray nozzle has a constant moving speed, a forming height of Z axis at every layer is a certain value, an area of the effective printing region of the spray nozzle at different rotation angles is in direct proportion to the width thereof in a unit time.

8. The 3-dimensional printer spray nozzle capable of adjusting cross section areas of extruded materials, as recited in claim 6, wherein both the cross section area of the inner channel of the feeding pipeline and that of the extruder are a same rectangle, wherein a length of a long side of the rectangle is Lmax, a length of a short side thereof is Lmin; a rotation angle of the feeding pipeline around the axis perpendicular to both the cross section area of the inner channel of the feeding pipeline and that of the extruder is $\theta$; when the spray nozzle with the rotation angle of $\theta$ works along one direction, a width of an effective printing region is Lmax×sin $\theta$+Lmin×cos $\theta$; when the spray nozzle has a constant moving speed, a forming height of Z axis at every layer is a certain value, an area of the effective printing region of the spray nozzle at different rotation angles is in direct proportion to the width thereof in a unit time.

9. The 3-dimensional printer spray nozzle capable of adjusting cross section areas of extruded materials, as recited in claim 7, wherein the external housing comprises a heater for heating ABS or PLA fusible transferring material in the feeding pipeline, such that the material is in a melted state.

10. The 3-dimensional printer spray nozzle capable of adjusting cross section areas of extruded materials, as recited in claim 8, wherein the external housing comprises a heater for heating ABS or PLA fusible transferring material in the feeding pipeline, such that the material is in a melted state.

11. A method for controlling printing speed and precision of a 3-dimensional printer with a 3-dimensional printer spray nozzle capable of adjusting cross section areas of extruded materials,
wherein a method of controlling the printing speed comprises steps of:
defining a printing speed $V=K*S*L$; wherein S is a cross section area of a filament actually sprayed by an extruder, L is a unit printing forming area, and K is a printing related constant;
determining a feeding speed by the cross section area S of the filament actually sprayed by the extruder and the unit printing forming area L, wherein a melting speed is also affected; the feeding speed and the melting speed together determine the printing speed; and
forming a signal referring to changes of S and L for controlling the printing speed and adjusting the feeding speed of a feeding pipeline of a spray nozzle;
wherein a method for controlling the printing precision comprises steps of: according to different precision requirements, adjusting the printing speed for controlling the printing precision; wherein, when high printing precision is required, the printing speed is slow; when low printing precision is required, the printing speed is fast.

12. The method for controlling printing speed and precision, as recited in claim 11, wherein a rotation angle of the extruder is adjusted by a motor for changing a cross section area S of a material actually sprayed by the extruder in a unit time; because a working moving speed of the spray nozzle is constant, for ensuring a Z-axis forming height of every layer is a certain value, the feeding speed of the feeding pipeline is real-time controlled according to the cross section area S of the material actually sprayed by the extruder; the feeding speed equals in value to the melting speed of the transferred material, and also equals to the printing speed V during printer working.

13. The method for controlling printing speed and precision, as recited in claim 11, wherein both a cross section area of an inner channel of the feeding pipeline and that of the extruder are a same rectangle, wherein a length of a long side of the rectangle is Lmax, a length of a short side thereof is Lmin; when the spray nozzle has a constant moving speed, a forming height of Z-axis at every layer is a certain value, an area of the effective printing region of the spray nozzle at different rotation angles is in direct proportion to the width thereof in a unit time; a width of an effective printing region is Lmax×sin $\theta$+Lmin×cos $\theta$; wherein a rotation angle of the feeding pipeline around the axis perpendicular to both the cross section area of the inner channel of the feeding pipeline and that of the extruder is $\theta$.

14. The method for controlling printing speed and precision, as recited in claim 12, wherein both a cross section area of an inner channel of the feeding pipeline and that of the extruder are a same rectangle, wherein a length of a long side of the rectangle is Lmax, a length of a short side thereof is Lmin; when the spray nozzle has a constant moving speed, a forming height of Z-axis at every layer is a certain value, an area of the effective printing region of the spray nozzle at different rotation angles is in direct proportion to the width thereof in a unit time; a width of an effective printing region is Lmax×sin $\theta$+Lmin×cos $\theta$; wherein a rotation angle of the feeding pipeline around the axis perpendicular to both the cross section area of the inner channel of the feeding pipeline and that of the extruder is θ.

15. The method for controlling printing speed and precision, as recited in claim 13, wherein the 3-dimensional printer spray nozzle comprises a feeding pipeline, an extruder located under the feeding pipeline, an external housing and a driving device; wherein the feeding pipeline is embedded in the external housing, the extruder is coaxially fixed under the feeding pipeline, a center of gravity of a cross section area of an inner channel of the feeding pipeline and a center of gravity of a cross section area of an inner channel of the extruder are located on a same axis which is perpendicular to the cross section area of the inner channel of the feeding pipeline and the cross section area of the inner channel of the extruder, the feeding pipeline is driven by the driving device to rotate around the axis relative to the extruder, thereby aiming at different rotation angles, widths of extruding forming areas of the extruder at a same direction are different so as to adjust a cross section area of a sprayed filament;
  wherein the driving device comprises a rotary table and a motor, wherein the rotary table is connected with a body of the printer, the motor is located within the external housing and is capable of driving the rotary table to rotate, and the feeding pipeline is fixed at a lower end of the rotary table;
  wherein both the cross section area of the inner channel of the feeding pipeline and that of the extruder are regular polygons;
  wherein the regular polygons comprise triangles and rectangles;
  wherein the external housing comprises a heater for heating ABS or PLA fusible transferring material in the feeding pipeline, such that the material is in a melted state.

16. The method for controlling printing speed and precision, as recited in claim 14, wherein the 3-dimensional printer spray nozzle comprises a feeding pipeline, an extruder located under the feeding pipeline, an external housing and a driving device; wherein the feeding pipeline is embedded in the external housing, the extruder is coaxially fixed under the feeding pipeline, a center of gravity of a cross section area of an inner channel of the feeding pipeline and a center of gravity of a cross section area of an inner channel of the extruder are located on a same axis which is perpendicular to the cross section area of the inner channel of the feeding pipeline and the cross section area of the inner channel of the extruder, the feeding pipeline is driven by the driving device to rotate around the axis relative to the extruder, thereby aiming at different rotation angles, widths of extruding forming areas of the extruder at a same direction are different so as to adjust a cross section area of a sprayed filament;
  wherein the driving device comprises a rotary table and a motor, wherein the rotary table is connected with a body of the printer, the motor is located within the external housing and is capable of driving the rotary table to rotate, and the feeding pipeline is fixed at a lower end of the rotary table;
  wherein both the cross section area of the inner channel of the feeding pipeline and that of the extruder are regular polygons;
  wherein the regular polygons comprise triangles and rectangles;
  wherein the external housing comprises a heater for heating ABS or PLA fusible transferring material in the feeding pipeline, such that the material is in a melted state.

* * * * *